Figure 1:
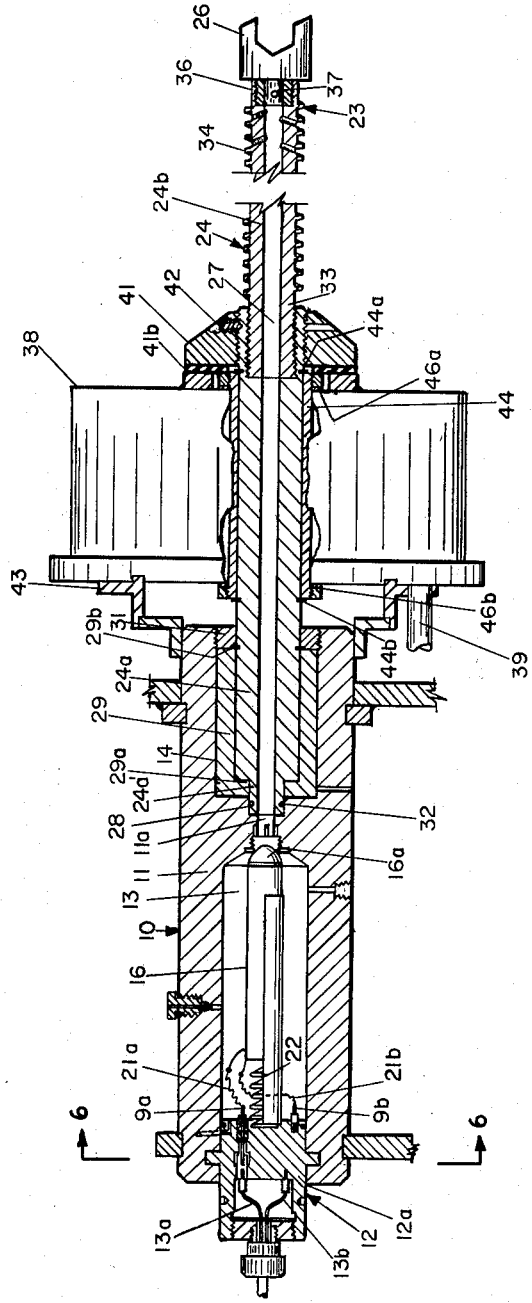

Sept. 25, 1962 R. W. LAWRENCE ET AL 3,055,648
MINING BLASTING APPARATUS
Filed Dec. 30, 1958 8 Sheets-Sheet 1

ROBERT W. LAWRENCE
ROBERT J. SHIEL
INVENTORS

BY Ernest G. Peterson
AGENT

Sept. 25, 1962 R. W. LAWRENCE ET AL 3,055,648
MINING BLASTING APPARATUS
Filed Dec. 30, 1958 8 Sheets-Sheet 2

ROBERT W. LAWRENCE
ROBERT J. SHIEL
INVENTORS

BY Ernest G. Peterson
AGENT

Sept. 25, 1962    R. W. LAWRENCE ET AL    3,055,648
MINING BLASTING APPARATUS

Filed Dec. 30, 1958    8 Sheets-Sheet 3

ROBERT W. LAWRENCE
ROBERT J. SHIEL
*INVENTORS*

BY *Ernest G. Peterson*

AGENT

Sept. 25, 1962   R. W. LAWRENCE ET AL   3,055,648
MINING BLASTING APPARATUS
Filed Dec. 30, 1958   8 Sheets-Sheet 4

ROBERT W. LAWRENCE
ROBERT J. SHIEL
INVENTORS

BY Ernest G. Peterson

AGENT

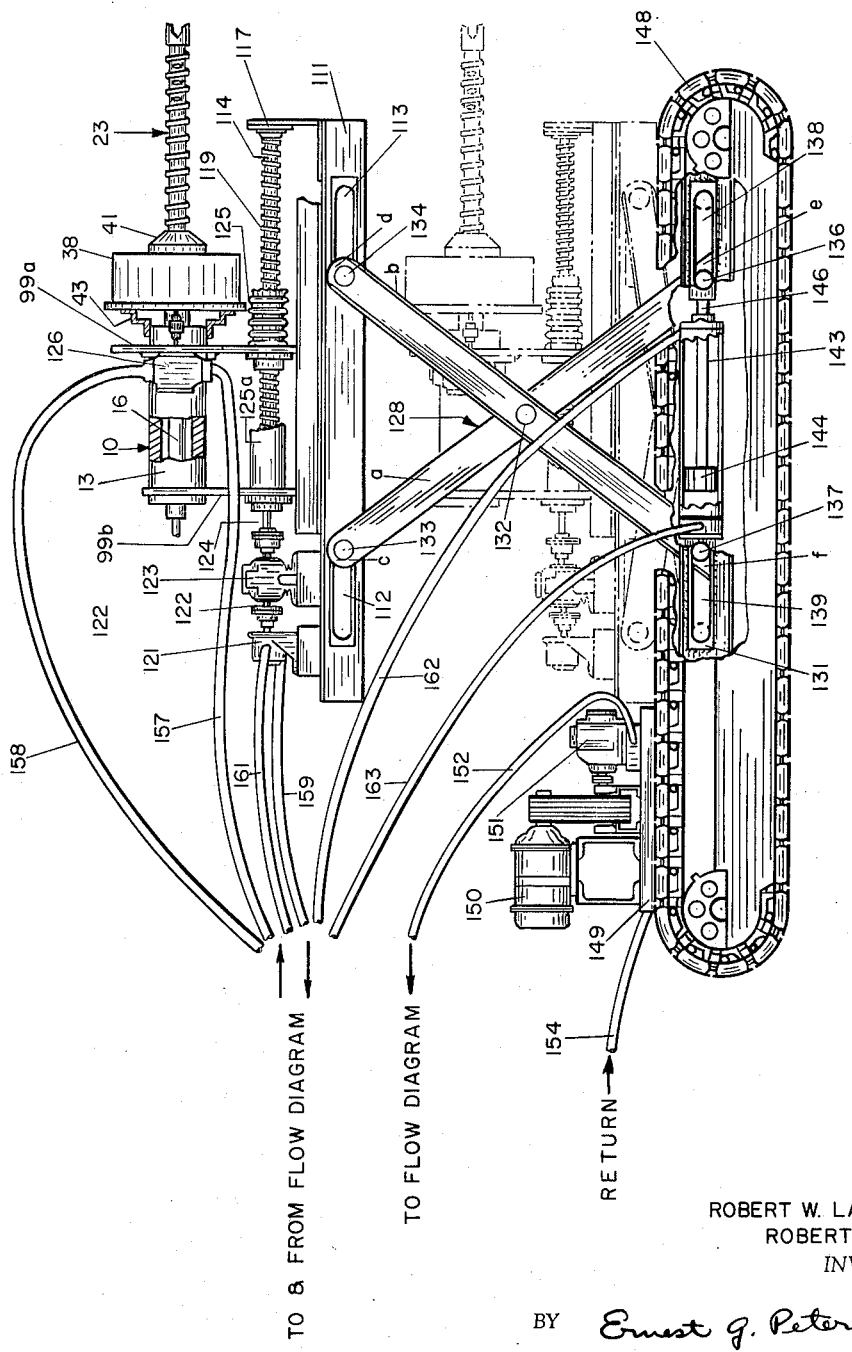

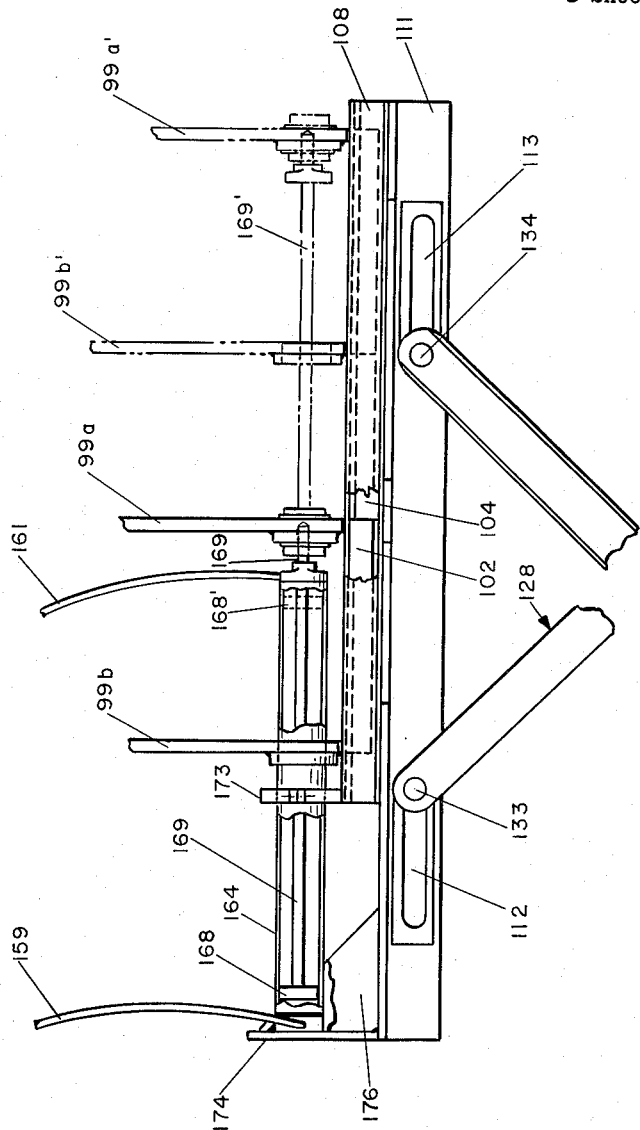

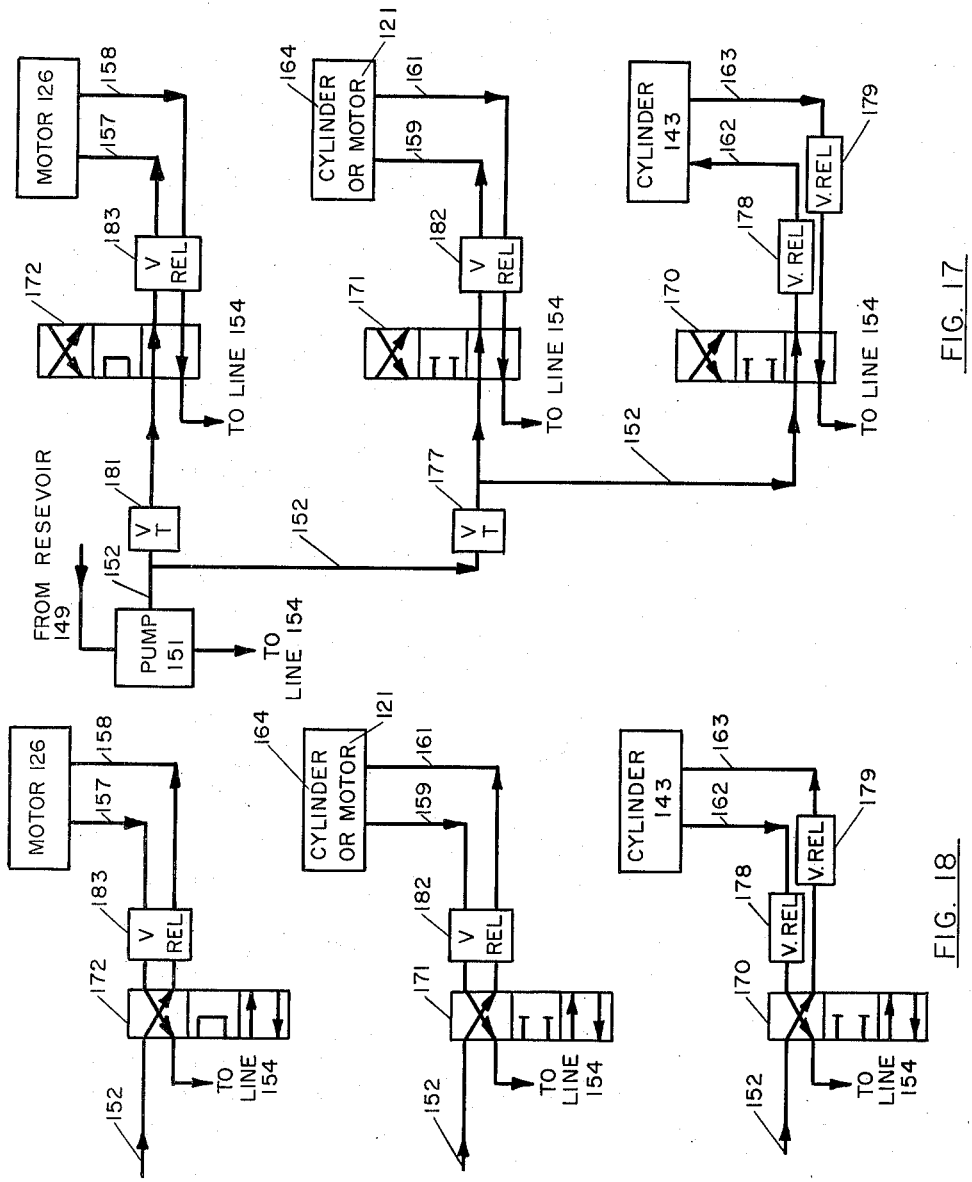

United States Patent Office

3,055,648
Patented Sept. 25, 1962

3,055,648
MINING BLASTING APPARATUS
Robert W. Lawrence, Wilmington, Del., and Robert J. Shiel, Canonsburg, Pa., assignors to Hercules Powder Company, Wilmington, Del., a corporation of Delaware
Filed Dec. 30, 1958, Ser. No. 783,867
9 Claims. (Cl. 262—12)

This invention relates to apparatus for blasting mineral deposits. In one aspect this invention relates to a combined chamber and drill assembly which contains a thermally decomposable gas-producing charge capable of self-sustained decomposition and which is adapted to initiate decomposition of the said charge and deliver resulting gases through the drill stem for drilling and blasting without the need for withdrawing the stem and bit from the area to be blasted. In another aspect this invention relates to a chamber and drill assembly, of the kind above described, in combination with structure for raising and lowering said assembly and moving said assembly horizontally during utilization of same in a blasting operation, and for moving the said chamber and drill with associated raising, lowering and horizontally moving means, from one point to another in the blasting area. In another aspect this invention relates to a chamber and drill assembly, of the kind above described, wherein the gas-producing charge is disposed within an elongated package formed from a combustible material and which contains a rupturable element in one end as a closure therefor, the said rupturable element being seated across the face of a chamber exit conduit, connecting with the drill stem, to close same and adapted to rupture in response to pressure developed by decomposition of the said charge.

Various mechanical mining systems have been provided in the art. In most instances a separate system of cutting bars is applied to the face for cutting a section of the mineral formation, which is supplemented in many instances by side and/or top cutting. The cutter machine is removed and replaced by a drilling machine for drilling boreholes in the formation. The drilling machine is removed and the coal is blasted by action of a suitable detonating explosive, or a compressed gas, in the borehole. A loading machine is then brought in to load the coal onto conveyors and carried away. Continuous tunneling machines of the rotary type, and rotary machines in conjunction with conveyors, have been utilized. These operations are, of course, cumbersome and are characterized by high time and equipment requirements and, further, are unsatisfactory from the standpoint of various operating difficulties encountered in the successive handling of such a large number of pieces of equipment.

More recently combined drilling and mining devices have been provided which require a compressor for delivery of high pressure air into the borehole through the drill stem either with or without rotation of the stem. These devices require heavy compressor equipment with long air pressure lines to the mine face, and are particularly disadvantageous from the standpoint of maneuverability. Further, these devices require rather complicated valve mechanisms for regulation of the release of air pressure to the borehole, which mechanisms are subject to repairs and replacements after rather short operating periods.

This invention is concerned with a combined chamber-drill assembly and a thermally decomposable gas-producing charge within the chamber capable of sustaining its own decomposition in combination therewith as a source of gas for delivery via the drill stem to the area to be blasted, to provide for high breakage yields while eliminating any need for the bulky, difficultly maneuverable compressor systems of the prior art and the intricate valve and control systems required in the utilization of same.

An object of the invention is to provide a chamber-drill assembly containing a thermally decomposable gas-producing charge and means for initiating said charge and for delivery of resulting gas product from the chamber through the drill stem and wall. Another object is to provide a machine comprising such a chamber-drill assembly in combination with structure for maneuvering the assembly in the utilization of same during blasting operations.

Another object is to provide a chamber-drill assembly above described wherein the gas-producing charge is contained in a cartridge having a rupturable member as a closure therefor seated across an exit-way from the zone of confinement and rupturable, when seated, by pressure developed by decomposition of the said charge. Other objects and aspects will be apparent from the accompanying disclosure and the appended claims.

In accordance with the invention, mining apparatus is provided which comprises a chamber; a thermally decomposable gas-producing charge within said chamber capable of self-sustained decomposition; means associated with said chamber for initiating said decomposition, and means for releasing resulting gas decomposition product from said chamber at a predetermined pressure level; a hollow stemmed drill-bit assembly with ports in the stem wall, and said stem being rotatably connected with said chamber to receive said gas decomposition product when released from said chamber.

Also in accordance with the invention is provided a method for breaking an earth formation which comprises drilling a borehole in the formation; during said drilling, supporting a thermally decomposable gas-producing charge capable of self-sustained decomposition adjacent the end of the stem of the drill assembly, opposite the bit; initiating decomposition of said charge without withdrawing said drill from the borehole; confining resulting gas decomposition product up to a predetermined high pressure and then releasing same from the zone of confinement into said stem through the said end thereof and then through the stem wall to said formation.

In accordance with a preferred embodiment of the chamber-drill assembly of the invention, the gas-producing charge is disposed in a closed elongated package formed from a combustible material and containing a rupturable element in one end as a closure therefor. The said package is supported within the chamber so as to seat the rupturable member against the face of a conduit which extends from the chamber to connect with the drill stem. The rupturable element closes the said conduit and ruptures in response to development of a predetermined gas pressure by decomposition of the gas-producing charge.

The invention also provides means associated with the chamber-drill assembly for moving it forwardly and in reverse and for raising and lowering it during its utilization.

One mechanism, in combination with the chamber-drill assembly, for moving the said assembly forwardly and in reverse, i.e., horizontally, is a stationary screw mechanism, below the said assembly, threadably connected with one or more supports for said assembly extending downwardly therefrom. The chamber-drill assembly supports are slidably mounted on one or more runners, so that upon rotation of the screw the threaded supports are moved along the screw backward or forward as the case may be. One alternative to the screw structure, and which is now preferred, is a fluid cylinder-piston assembly, the closed end of the cylinder being stationary and the piston rod being connected at its end with one of the downwardly extending supports so as to move the chamber-drill on its slidably mounted supports forwardly or in reverse as desired. Of course, if desired the cylinder can be affixed to the said supports and the piston rod maintained stationary.

A now preferred mechanism, in combination with the chamber-drill assembly, for raising and lowering the said assembly is a scissors-type elevator comprising a pair of X-beam members, each supported by a scissors pivot rod and disposed below the chamber-drill assembly and associated structure for moving same horizontally. Each beam pair is slidably connected at the top ends with the above said assembly and slidably connected at its bottom ends with suitable beam support means. Means is provided for driving the X-beam about the pivot rod, i.e., into open or closed position to raise or lower the chamber-drill assembly.

A now preferred means, in combination with the chamber-drill assembly, for initiating decomposition of the gas-producing charge in the chamber comprises a breech block, generally an electric conductor, as a closure for one end of the chamber with electric lead wires extending from outside said chamber into said block, and a pair of electrodes extending into said chamber from the block and operatively connected with the leads to receive electric current therefrom for initiation of the gas-producing charge. Each of a plurality of lugs extends from the side of the block and is adapted to engage, and ride in, a groove in a side wall of the chamber end during insertion of the block in the chamber end as a closure therefor. The lugs are in alignment with a passageway in the chamber wall adjacent each groove, when the block is fully inserted in the chamber end. Thus by rotating the block, the said lugs are caused to engage the passageway and lock the block in position as a closure for the chamber. A further feature of the breech block, or firing head, above described, is a pair of conduits which extend from the chamber interior through a portion of the block toward the chamber wall and are adapted to engage conduits extending through the chamber wall when the block is only partially disengaged from its locking position. This feature provides for vent-in gases from the chamber, developed by decomposition of the charge, when for any reason their normal discharge from the chamber is blocked.

The chamber-drill assembly, including means for moving the assembly vertically and means for moving it horizontally, is advantageously supported on a carrier, such as on a pair of tracks or treads for facilitating movement of the structure from one operating area to another. In a preferred embodiment of apparatus, the entire chamber-drill and associated structure for raising and lowering it, and moving it horizontally, is mounted on a loader device, the latter mounted on treads so as to be easily moved to the work.

Figure 2:
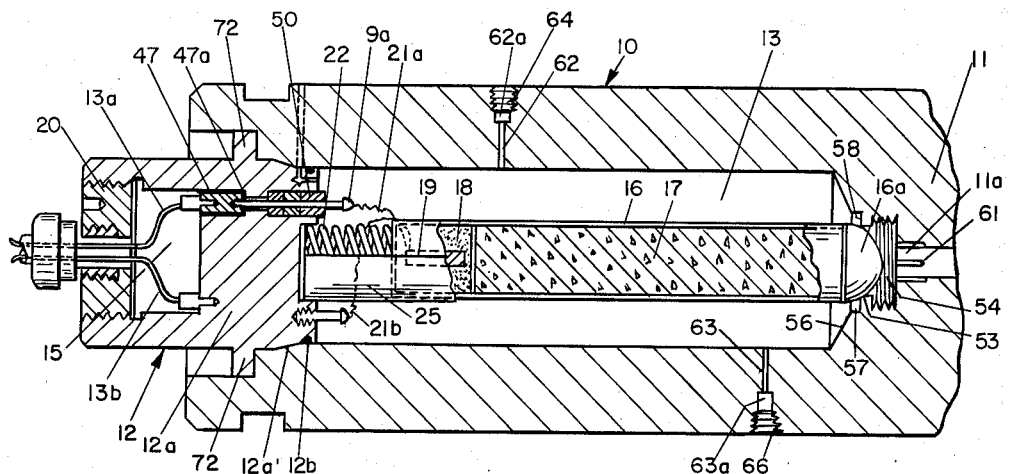
Figures 3, 4, 5:
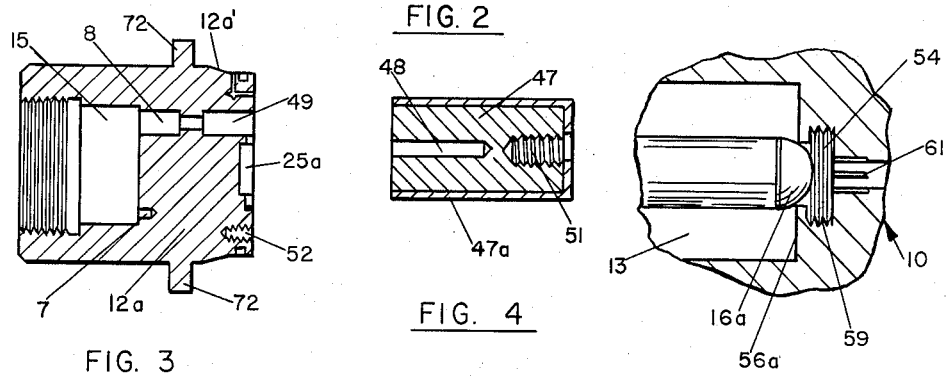
Figures 9, 10:
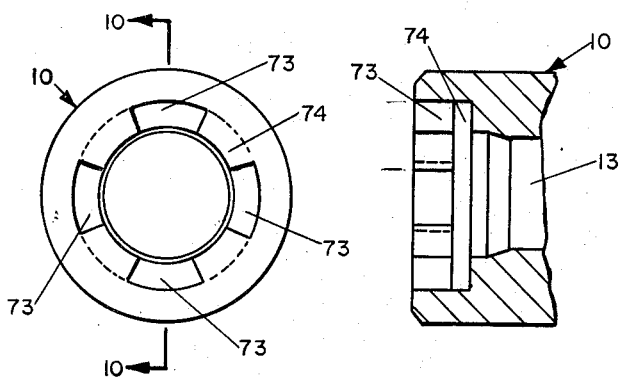
Figure 6:
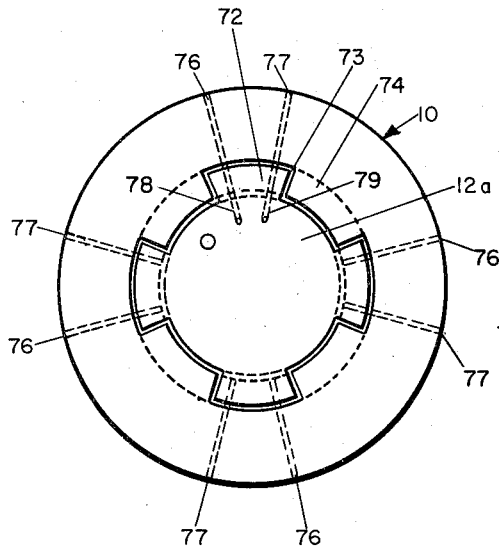
Figure 7:
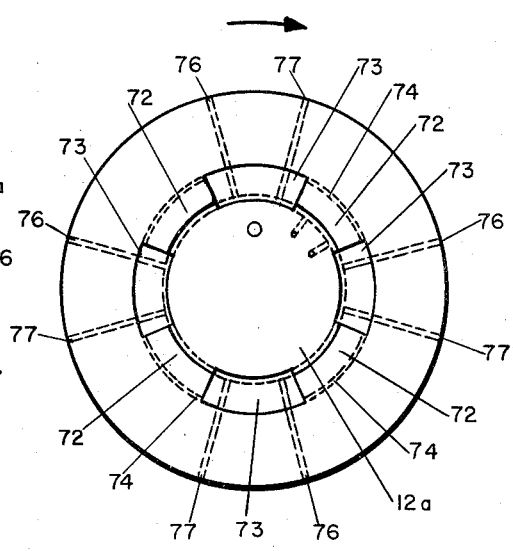
Figure 8:
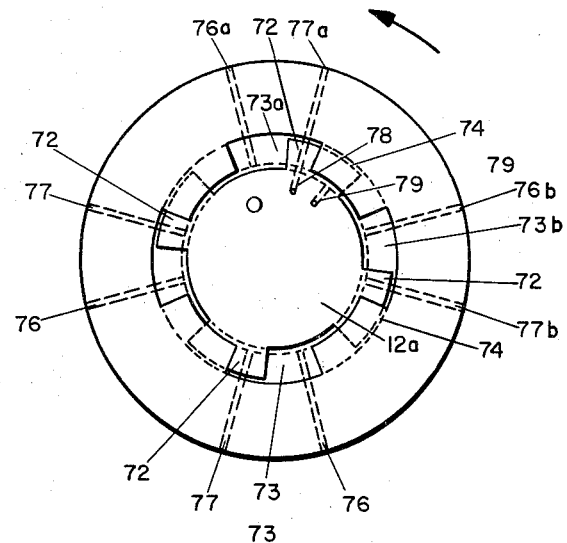
Figure 12:
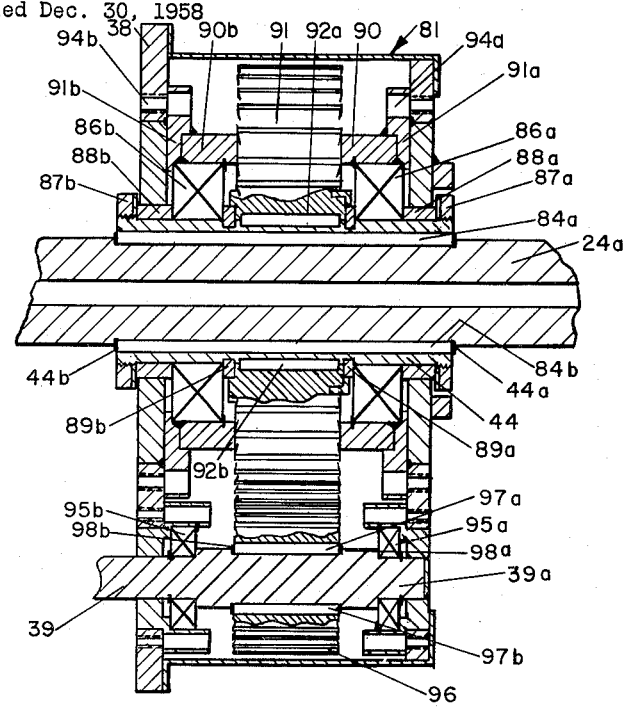
Figure 11:
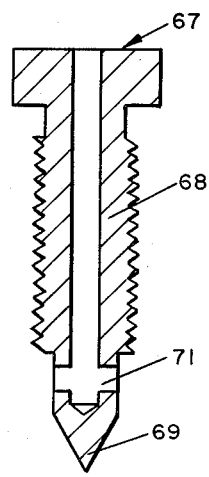
Figure 14:
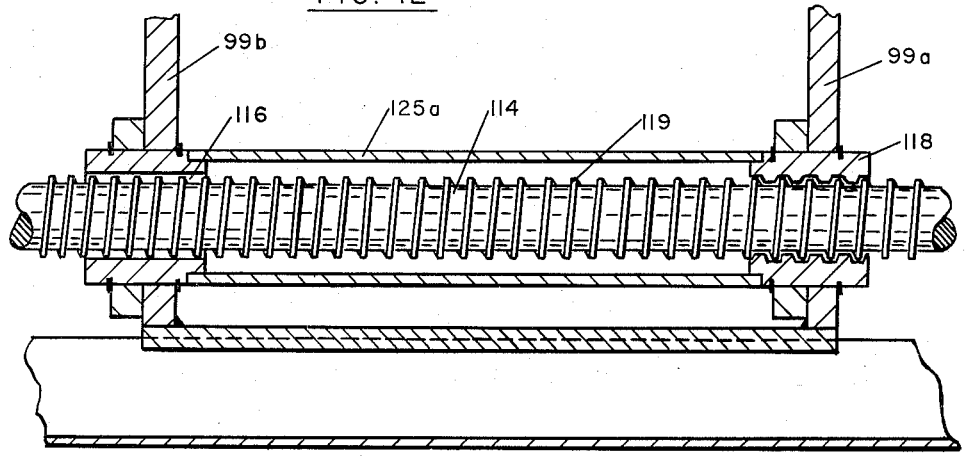
Figure 16:
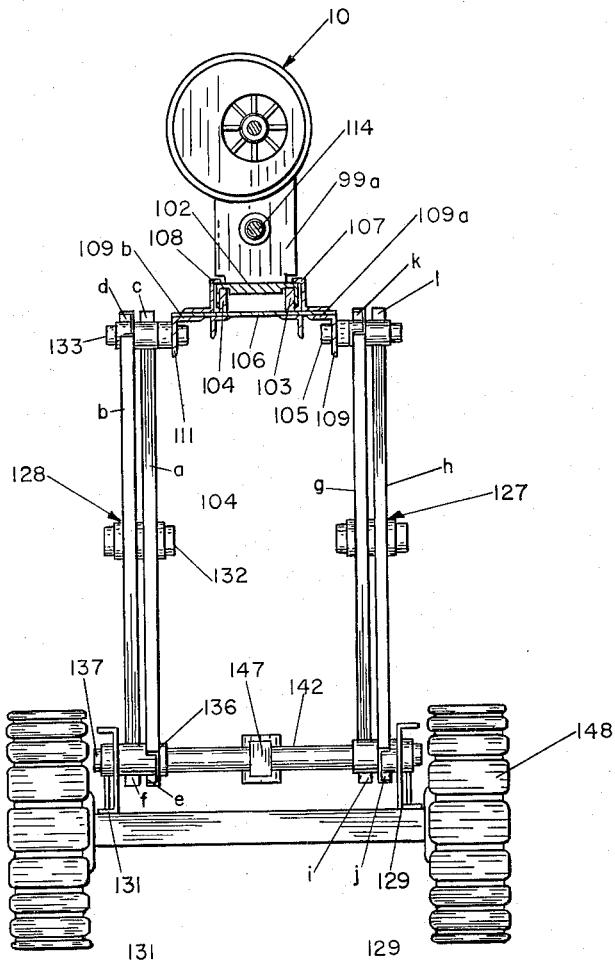

The invention is further illustrated with reference to the drawings of which FIG. 1 is a cross section taken along the length of a preferred embodiment of chamber-drill assembly of the invention; FIG. 2 is an enlarged and more detailed cross section along the length of a chamber section of FIG. 1; FIG. 3 is a sectional view of a block element of a breech, or closure, block of the chamber of FIGS. 1 and 2; FIG. 4 is an enlarged cross-sectional view of an insulated conductor-connector of FIGS. 1 and 2 for connecting a lead wire extending into the connector from outside the chamber in insulated conductive contact with an electrode in the chamber; FIG. 5 is illustrative of a seating of a rupturable element of, and alternative to that of, FIGS. 1 and 2; FIG. 6 is illustrative of a breech block closure of FIGS. 1 and 2, in unlocked position and taken along the line 6—6 of FIG. 1; FIGS. 7 and 8 are the same as FIG. 6 except that they illustrate, respectively, the breech block in completely locked position in the end of a chamber of FIGS. 1 and 2 and in partially unlocked position to provide for venting of gases from the said chamber when normal gas discharge from the chamber fails; FIG. 9 is an end view of a chamber of FIGS. 1 and 2 adapted to accept a breech block closure of FIGS. 1, 2 and 6–8; FIG. 10 is a view taken along the line 10—10 of FIG. 9 illustrative of grooves in the side wall of the chamber for accepting lug elements of the breech block closure of FIGS. 1, 2 and 6–8; FIG. 11 is illustrative of a needle-type valve for seating in a wall of a chamber of FIGS. 1 and 2 to provide for venting of gas pressure from the chamber when normal gas discharge fails; FIG. 12 is illustrative of a suitable gear reducer assembly of FIG. 1, operatively connected with the drill stem to provide the desired rate of rotation therefor; FIG. 13 is illustrative of a chamber-drill assembly of FIG. 1 in combination with traverse screw-type means for moving the assembly forwardly and in reverse direction, a scissors-type elevating mechanism for raising and lowering the assembly and associated traverse screw, means for moving the entire combination of chamber-drill, traverse screw and scissors beams from one area to another, and fluid-operated means for driving the said combination of elements; FIG. 14 is a detailed cross section of a portion of a screw shaft of FIG. 12 and is illustrative of a nut element in conjunction with a chamber-drill assembly support for horizontally moving the said assembly; FIG. 15 is a view of a fluid cylinder-piston assembly for moving a drill assembly of FIG. 1 in lieu of a traverse screw assembly of FIGS. 13 and 14; FIG. 16 is a front view of the assembly of FIG. 13; and FIGS. 17 and 18 are schematic diagrams illustrative of fluid flow that can be utilized in the operation of the fluid pressure actuated devices of FIGS. 13 and 15.

With reference to FIG. 1, elongated housing 10, generally cylindrical, is open at each end and contains partition, or wall, 11 disposed across its longitudinal axis to divide housing 10 into chambers 13 and 14. Conduit 11a is disposed through wall 11 so as to connect chambers 13 and 14 and is preferably coaxial with those chambers.

The open end of chamber 13 opposite wall 11 is closed by firing head assembly 12 containing lead wires 13a and 13b insulated from each other and extending into head section 12a and in electrical conductive contact with electrodes 9a and 9b, respectively. Cartridge 16, see also FIG. 2, is elongated and is closed at its end closest head assembly 12 by any suitable means and at the other end by a rupturable element 16a and contains a main charge disposed so as to be adjacent rupturable closure member 16a of (1) a solid composition 17 capable of thermal decomposition with the evolution of gases without flame and capable of self-sustained decomposition when initiated by heat applied merely to a local portion thereof, (2) a suitable primer composition 18 intermediate the end of cartridge 16, opposite closure 16a, and adjacent charge 17, and (3) an electric initiator 19 embedded in primer 18, the primer 18 and initiator 19 being in operative relationship to initiate decomposition of charge 17 in response to passage of electric firing current passed across electrodes 9a and 9b through leads 21a, 21b and initiator 19. Other suitable primers and initiators can be employed in place of those herein illustrated, as later described.

Cartridge 16 is disposed within chamber 13 so as to seat closure 16a against the face of conduit 11a adjacent thereto and is initially biased in that seated position by any suitable biasing means such as coil spring 22 supported against closure member 12. Cartridge 16 and firing head assembly 12 and associated elements are described more fully hereinafter with reference to FIG. 2.

Drill bit and stem assembly 23 comprises a drill stem 24, a bit 26 secured to one end of stem 24, and a perforation 27 longitudinally, preferably coaxially, extending from the end of stem 24, opposite bit 26, toward the latter for at least a major portion of the length of the stem to provide a "hollow" stem. Drill stem 24 advantageously comprises two sections 24a and 24b for purpose of facilitating both assembly and disassembly of the unit, and replacement, if and when necessary, of the stem portion directly contacting the work.

Drill assembly 23 at its open end, i.e., opposite bit 26, is rotatably mounted in housing 10 so as to dispose perforate section 27 in direct open communication with chamber 13 via conduit 11a. The stem section 24a with end portion 24a', of smaller diameter, is supported in chamber 14 with end portion 24a' in recess 28 of wall 11 adjacent chamber 14. Stem section 24a is supported in recess 28, preferably coaxially, with conduit 11a by sleeve bearing support member 29 including end portion 29a maintained by retainer ring 29b, the latter supported by nut 31 threaded in the inner wall of chamber 14. O-ring 32 within recess 28 is disposed around section 24a' of stem 24a in gas-tight relationship with the inner wall of recess 28 and stem portion 24a to thereby maintain perforation 27 in direct open gas-tight communication with chamber 13 via line 11a. Stem section 24a contains recess 33, with its inner wall threaded, in its end adjacent stem section 24b. Stem section 24b is threadably inserted and supported in recess 33 coaxially and in gas-tight relationship with stem section 24a. Flights 34 are spirally disposed around stem 24b so as to direct cuttings along stem 24b away from bit 26, the latter being threadably inserted into and supported in recess 36 of stem section 24b, at the end thereof opposite section 24a. Ports 37 are disposed in a side wall of stem section 24b, preferably in close proximity to bit 26, the total cross-sectional diameter of ports 37 being at least equal to that of conduit 11a. Means for rotating stem 24a and thus the entire stem assembly 24 to operate bit 26 comprises a gear reducer assembly contained within housing 38 and driven by shaft 39 and operatively connected with drill stem 24a to rotatably drive drill stem 24a.

Cone member 41 is threadably supported around the endmost portion of stem 24a containing recess 33 and is secured in its threaded position by a brass set screw 42 and disposed with the apex pointed toward bit 26. The external surface of cone 41 is knurled to facilitate grinding action of the cone 41 against the face of the formation to seat the cone and form a closure for the borehole when stem member 24b and bit 26 are fully advanced into the formation. Cone member 41 can be spaced apart from housing 38, or abutted, as desired. However, it is advantageously spaced from housing 38 to provide for insertion of a suitable resilient material in the intermediate space to absorb energy from recoil. Thus, a ring of resilient material 41b, for example, rubber or a rubber-like material can be disposed between cone 41 and housing 38 to constitute such a recoil element. Housing 38 is supported by a suitable tongued ring assembly 43 rigidly connected with both housings 38 and 10 in order to stabilize alignment of the gear reducing assembly in housing 38 with the remainder of the assembly.

Hollow shaft 44 associated with gear reducer means as described hereinafter in housing 38 is supported as a sleeve around, and keyed with, stem 24a and is supported in place by retainer rings 44a and 44b secured around stem 24a and abutting opposite ends of shaft 44. Housing 38 disposed around hollow shaft 44 is supported on sleeve 44 within ring flanges 46a and 46b, each threadably engaged with opposite ends of sleeve 44.

With further reference to FIG. 2, conductor closure block, or firing head, 12, which closes chamber 13 and contains leads 13a and 13b and electrodes 9a and 9b, comprises electrical conductor block 12a containing recess 15 in its end external to chamber 13 and closure nipple 20 threadably secured across the open end of recess 15. Insulated electrical leads 13a and 13b extend from outside assembly 12, supportably through nipple 20, into and through recess 15, and into central block portion 12a. Lead 13a is terminated in block portion 12a in electrical conductor block 47, the latter insulated, in recess 8, from block 12a by a surrounding insulating layer 47a, see also FIG. 4. Any suitable support for lead 13a in block 47 can be utilized. Now preferred is a friction support prepared by insertion of the end of lead 13a, without removal of insulation therefrom, into an opening, or recess, 48 in block 47, see FIG. 4, in a manner to provide scraping of insulation from the lead wire and an accumulation of displaced insulation in binding relationship with the block wall forming opening 48 to thereby secure lead 13a in insulated electrically conductive contact with block 47. Lead 13b is supported in recess 7 in block portion 12a, see FIG. 3, in direct electrical contact therewith by any suitable means such as by a friction support of the type above described with reference to lead 13a in block 47.

Electrode 9a within chamber 13 is extended into and through recess 49 of block portion 12a, see also FIG. 3, toward and into recess 51 of conductor block 47 in threaded electrically conductive engagement therewith. Electrode 9a is insulated from block portion 12a by any suitable means such as a nonconductive packing 50. Electrode 9b is threadably engaged with the block portion 12a in recess 52 so as to be in direct electrical contact therewith.

Elongated cartridge guide, or shelf, 25 in chamber 13 is secured at one end in the recess portion 25a, see FIG. 3, in the end of block portion 12a so as to extend in a direction substantially parallel with the axis of chamber 13. Guide 25 serves as a carrier for cartridge 16 during insertion of same into chamber 13.

It is important when supporting cartridge 16 in chamber 13 that rupturable end member 16a be seated against a suitably sharp edge to secure seatings during operation with successive charges and minimum variation in the rupture pressures required. As shown in FIG. 2, closure member 16a is seated against the end, or face, 53 of recess 54 in wall 11 adjacent chamber 13, preferably coaxially with conduit 11a, and having a diameter larger than that of conduit 11a. The face 53 is preferably in a plane perpendicular to the axis of chamber 13, and the inner wall of recess 54 adjacent face 53 is preferably in a plane parallel to the said chamber axis, under which conditions a suitably sharp seating edge is provided. If desired, that angle formed by the intersection of the two surfaces, i.e., face 53 with the inner wall of recess 54, encompassing a portion of wall 11, can be less than 90° although 90° is generally sufficient. Inasmuch as the contour 56 of the end wall of chamber 13 is generally conical rather than flat due to preferred fabrication procedures utilized, it is advantageous to provide recess 57 in wall 11 intermediate recess 54 and the interior of chamber 13. Recess 57 is preferably coaxial with recess 54, having a diameter larger than that of recess 54, and containing a flat contour 58 common to the face 53. In this manner the rupturable element 16a is seated against a suitably sharp edge, whereas without recess 57 intersection of the conical contour 56 with end 53, or of conduit 11a, would form an angle greater than the above described 90° with a concomitantly duller seating edge. With reference to FIG. 5 is shown a suitable seating for the element 16a without the need for a supplemental recess 57 in which the contour 56a at the end of chamber 13 is flat and lies in a plane perpendicular to the axis of the chamber 13 to provide, with the inner wall of recess 54, for the desired sharp seating edge. Of course, if desired, conduit 11a can be extended in lieu of recess 54 to provide its own end or face as a seat for member 16a, in which event the contour of the end wall of chamber 13 is preferably flat, as illustrated with reference to contour 56a of FIG. 5.

Recess 54 is provided along its inner wall with threads 59 which provide for release of gas from chamber 13 in the event that rupture of element 16a is incomplete so as to otherwise cause stoppage of recess 54 to block the escape of gases from chamber 13 into and through conduit 11a.

Conduit 11a contains longitudinally extending slots 61 in its inner wall in an area adjacent recess 54 to further provide for escape of gases from chamber 13 in the event of stoppage of conduit 11a due to incomplete breakup of the rupturable element 16a.

Venting means are provided for release of pressure from chamber 13 in event of failure of element 16a to rupture when charge 17 is initiated. Thus, conduits 62 and 63 extend from the inside of chamber 13 through its side wall to valve seats 62a and 63a, respectively, the latter connected, respectively, with internally threaded passageways 64 and 66 so as to be in open communication with the exterior of chamber 13. A needle valve 67, see FIG. 11, comprises an elongated housing 68 threaded along its length so as to threadably engage a passageway 64 or 66, and needle 69 adapted to seat in a seat 62a or 63a and an internally disposed conduit 71 extending from a point adjacent seat 69 through the opposite end of housing 68 so as to close a conduit 62 or 63 when threadably disposed to seat needle 69 and to permit escape of gases through conduit 71 when the said needle is unseated. Conduits 62 and 63 and associated structure are provided for emergency purposes only, i.e., to provide for venting of gases from chamber 13 when, for any reason, escape via conduit 11a is cut off.

Other suitable means for venting gas pressure from chamber 13 can be used in lieu of threads 59 and slots 61. Thus, a by-pass conduit in the wall forming recess 54 to lead gas around such an obstruction, as above described, can be utilized.

Firing assembly 12 can be supported as a closure for chamber 13 in any suitable manner. However, assembly 12 is most advantageously utilized when it can be quickly engaged and disengaged from operating position. Thus, in accordance with a preferred embodiment, block 12a contains spaced apart lugs 72 along the periphery of a central or lower portion thereof. The open end section of shell 10 contains grooves 73, see also FIG. 9, substantially parallel with the axis of chamber 13, each in alignment with a lug 72 of assembly 12 when the latter is inserted into the open end of chamber 13. Each groove 73 is of length at least sufficient to terminate adjacent a circumferentially disposed passageway, or undercut, 74 in the wall of chamber 13 and in open communication with each groove 73. Passageway 74, see FIGS. 9 and 10, is preferably positioned immediately below grooves 73 so as to receive the lugs 72 from the groove 73 when the firing head 12 is fully inserted into the end of the chamber 13. Block 12a is advantageously tapered along an end section 12a' (FIG. 2), in which case the inner wall of chamber 13 is tapered so as to seat the tapered end 12a'. O-ring 12b around tapered end 12a' forms a gas-tight seal between block 12a and the wall of chamber 13 when the head assembly 12 is fully inserted as a closure for chamber 13. In the seated position with lugs 72 at the foot of grooves 73 and within passageway 74, head assembly 12 is adapted to be rotated so as to move lugs 72 along the circumferentially disposed passageway 74. In this manner the lugs 72 are adapted to be disposed in an undercut portion of block 12a, i.e., beneath the chamber wall portion above passageway 74, in locked position as a closure for chamber 13.

As illustrated with reference to FIGS. 6, 7 and 8, firing head assembly 12 is inserted into chamber 13 with each lug 72 engaged with a groove 73 in the chamber wall. Thus, as shown in FIG. 6, firing head assembly 12 is inserted into chamber 13 and is disposed so that the entire portion of each lug 72 is directly aligned with a groove 73 so that upon being vertically moved each lug can move within the said groove 73. Assembly 12 in this position is referred to herein as unlocked within chamber 13. As illustrated with reference to FIG. 7, assembly 12, when in the unlocked position of FIG. 6 and then rotated either clockwise or counterclockwise, will cause each lug 72 to move into an adjacent portion of passageway 74, intermediate a pair of grooves 73, so that each lug 72 is locked in position, i.e., so far as vertical movement out of chamber 13 is concerned, by that portion of chamber wall 13 which forms a top wall of passageway 74 and protrudes over each lug 72 to prevent its upward movement. Of course, to unlock assembly 12 in chamber 13 it is necessary only to rotate the assembly 12 from its position of FIG. 7 either clockwise or counterclockwise sufficiently to dispose each lug 72 in direct alignment with a groove 73, as shown in FIG. 6.

A system of conduits, illustrated with reference to FIGS. 1, 2, 6, 7 and 8, is provided for venting high pressure gas from chamber 13 in those instances wherein for any reason discharge of gas via conduit 11a has failed. These conduits are so disposed as to provide for venting the said gas by rotating the firing assembly 12 of FIG. 7 toward the unlocked position of FIG. 6 but short of the latter position so as to engage the said conduits and provide for discharge of gas from the chamber through a portion of the firing block and the chamber side wall.

Thus, as illustrated in each of FIGS. 6, 7 and 8, a plurality of conduit pairs 76 and 77 is disposed through the chamber wall from the outside of the chamber toward the head 12a so as to be closed by assembly 12a when the latter is fully inserted in position in chamber 13, i.e., except for conduits 78 and 79 described hereinafter. Conduits 78 and 79 extend through a portion of assembly 12 from its face adjacent the chamber 13 interior, toward the wall of chamber 13. When assembly 12a is in completely locked position as shown with reference to FIG. 7, conduits 78 and 79 are out of direct communication with conduits 76 and 77. Each conduit pair 76 and 77 extends into chamber 13 along any suitable path preferably so as to terminate in a portion of the inner wall of chamber 13 directly below a groove 73 as illustrated with reference to FIGS. 1 and 2. Each conduit pair 78 and 79 is advantageously extended from direct communication with the chamber 13 interior face in a direction substantially parallel to the axis of chamber 13 and then at an angle toward the chamber 13 wall, i.e., as an L, so as to be in direct communication with conduits 76 and 77, respectively, when the assembly 12 is in the unlocked position of FIG. 6. Although it is not important per se that conduits 76 and 77 directly communicate with conduits 78 and 79, respectively, in the said unlocked position, that arrangement does conveniently provide for the out-of-contact relationship of the conduit pairs 76—77 and 78—79 when assembly 12 is completely locked, see FIG. 7, and for direct communication of one of the pairs of conduits 76 and 77 with one of the pairs of 78 and 79 when the block 12 is rotated from the locked position of FIG. 7 to a partially unlocked position of FIG. 8, it being understood that the direction of rotation is immaterial.

As illustrated with reference to FIG. 8, when the locked firing assembly 12 of FIG. 7 is rotated counterclockwise toward the unlocked position of FIG. 6, lug 72 upon being moved partially into an adjacent groove 73a also moves conduit 78 in direct open communication with conduit 77a to provide for any required venting of chamber 13. Had block 12 been rotated in the opposite direction, i.e., clockwise, lug 72 would have been moved partially into groove 73b sufficiently to directly communicate conduit 79 with conduit 76b so as again to provide for the venting without moving the block entirely into the locked position of FIG. 6.

Drill assembly 23 axially and rotatably supported in chamber 14, as above described, can be axially rotated in any suitable manner. In a now preferred embodiment, as illustrated with reference to FIG. 12, a suitable gear reducer assembly 81 for rotation of assembly 23 is supported in housing 38 and adapted to be driven by a prime mover (not shown) connected with shaft 39 to thereby cause shaft 24a, and of course the entire assembly 23, to rotate at a predetermined rate. As shown, hollow shaft 44 is disposed around stem section 24a and supported in that position by retaining rings 44a and 44b and is keyed to stem 24a by keys 84a and 84b. Bearings 86a and 86b are supported in position around shaft 44 by the illustrated combination of lock rings 87a and 87b threadably secured to the ends of shaft 44, rings 88a and 88b, retainers 89a and 89b and retainers 90a and 90b, the latter supported in place by weldments 91a and 91b, respectively.

Gear 91 is disposed around hollow shaft 44 and supported in keyed engagement therewith by keys 92a and 92b and supported in position by retainer rings 89a and 89b, above described. The weldments 91a and 91b are adapted to be bolted to the inner wall of housing 38 at 94a and 94b to further support the gear assembly within housing 38.

Gear 96, of smaller diameter than gear 91, is supported around shaft 39 by bearings 95a and 95b supported similarly as bearings 86a and 86b. Gear 96 is intermeshed with gear 91 and in keyed engagement with shaft 39 by keys 97a and 97b, each held in locked position with gear 96 and shaft 39 by retainer rings 98a and 98b, each secured around shaft 39.

Shaft 39, supported at one end 39a in a wall of housing 38, extends through housing 38 in direct operative engagement with a fluid driven motor, described hereinafter, to drive the gear assembly to rotate shaft 24a at the predetermined rate, as described hereinafter.

The chamber-drill assembly of FIG. 1 can be mounted for utilization alone or in conjunction with one or more chamber-drill units in breaking earth formations and, accordingly, can be mounted in any suitable manner for that purpose. FIGS. 13–16 illustrate a chamber-drill assembly of FIG. 1 with associated support means for moving the assembly vertically and longitudinally into or away from the work.

Thus, with reference to FIGS. 13–16, plates 99a and 99b are rigidly secured, spaced apart, to housing 10 and associated assembly of FIGS. 1 and 2 and extend downwardly to horizontally disposed plate 102, further illustrated with reference to FIG. 16. Plates 99a and 99b are preferably each a part of, or attached to, a ring clamp around housing 10.

Substantially the entire weight of the housing 10 assembly is supported on plate 102 which in turn is slidably supported on beam runners 103 and 104 so as to be horizontally movable along those runners. Runners 103 are supported on base beam 106, which in turn is secured to pinion members for elevation of beam 106 and all elements supported thereon, as described hereinafter. Z-angles 107 and 108 are secured to base 106 in spaced apart relationship with beams 103 and 104, respectively, to provide a void space or track for guiding sliding movement of platform 102, the side portions of which are downwardly extended so as to ride in the void space, or track, provided. Horizontally disposed beam members 109 and 111 are secured, spaced apart, to the bottom of base plate 106 in a direction substantially parallel with beams 103 and 104. Beams 109 and 111 are generally in form of an angle member of which portions 109a and 111a are each welded to the bottom of plate 106. Each beam 109 and 111 contains a pair of horizontally disposed and spaced apart guide slots illustrated by guides 112 and 113 in beam 111 which engage pinions, as described hereinafter.

Horizontally disposed traverse screw 114, see also FIG. 14, is disposed below the housing 10 assembly and is supported at one end in plate 99b in a suitable bearing assembly 116, extends through plate 99a in threaded engagement therewith and is rotatably mounted at the other end in ball bearing assembly 117 mounted on plate 106, at about the end thereof. Plate 99a contains brass nut 118 engaged with threads 119 of screw 114. Thus, when screw 114, which is stationary in respect of longitudinal travel, is rotated, plate support members 99a and 99b are moved along the screw forward or backward depending upon the direction of rotation of the screw.

Fluid motor 121 is supported on base member 106 and is operatively connected via shaft 122 with gear reducer 123 which, in turn, is operatively connected by its drive shaft 124 with screw 114 to provide rotation of screw 119 at a predetermined rate to move the entire assembly, supported by plates 99a and 99b, horizontally.

Fluid motor 126, attached to plate 99a and operated as described hereinafter, is connected with shaft 39 of FIGS. 1 and 12 so as to drive drill stem 24a.

Screw 114 is completely covered with a bellows 125 intermediate plate 99a and bearing 117 and by housing 125a intermediate plates 99a and 99b.

With reference to FIG. 15 is shown a cylinder-piston assembly that can be used in lieu of the traverse screw and associated structure above illustrated with reference to FIG. 13. Fluid cylinder 164 contains piston 168 and is longitudinally mounted on plate 106 at a central point in upright plate 173 which fits tightly around cylinder 164 as a ring clamp and is secured to plate 106. Plates 99a and 99b of FIG. 12, which support housing 10 and associated assembly and rest on plate 102 which in turn is supported on beams 103 and 104, are associated with cylinder 164 and rod 169 so as to be movable with the same, i.e., horizontally, as when moved along screw 114. Thus, plate 99b is disposed around cylinder 164 in the same manner as it is disposed around housing 126 of FIG. 13, the latter containing screw 114, except that it is fitted loosely to permit plate 99b to be slidably movable along the axis of cylinder 164. Piston rod 169 extends from cylinder 164 and is rigidly secured at its end to plate 99a. Cylinder 164 at its end opposite that containing piston rod 169 is secured to upright support member 174, the latter supported in its upright position by gusset plates 176. Line 159 connects with that end of cylinder 164 secured to plate 174, and line 161 connects with cylinder 164 at the opposite end. Thus, as fluid enters cylinder 164 from line 159, piston 168 is urged so as to extend piston rod 169 from cylinder 164 to thereby move supports 99a and 99b along runners 103 and 104 and thereby move the mounted drilling assembly forward. FIG. 15 shows the result of operation of cylinder 164 when fluid is admitted via line 159 and discharged via line 161, the advanced position of the mounted assembly being indicated by dotted lines indicating the extended position of supports 99a and 99b with reference to 99a' and 99b'. Upon reversal of direction of fluid flow, i.e., introduction of fluid via line 161 and withdrawal via line 159, retraction of piston 158 and rod 169 is accomplished which causes retraction of the entire drill assembly along runners 103 and 104.

Again referring to FIGS. 13 and 16, a now preferred form of structure for elevating and lowering the entire assembly supported on base plate 106 comprises a pair of scissors-type beam assemblies 127 and 128, each operatively connected at its upper ends with plates 109 and 111, respectively, and at its lower ends with base plates 129 and 131, respectively, so as to raise base plate 106 when the scissors are closed and to lower it when the scissors are open. Thus, by way of further illustration, scissors beam pair 128 comprises beam members a and b supported at the scissors pivot point by pivot pin 132. The top ends c and d of beam members a and b are connected, respectively, with pinion rods 133 and 134, each of which extends perpendicularly toward beam 111 and into guides 112 and 113, respectively, in secured slidable relationship therein.

Bottom ends e and f of beams a and b are similarly connected by pinions 136 and 137, respectively, with guide slots 138 and 139 of base member 131. Base members 129 and 131 are below base members 109 and 111, respectively, and parallel therewith. Base member 129 also contains a pair of guides, as above illustrated, with reference to base 131, for accepting pinions extending from the bottom ends *i* and *j* of members *g* and *h* of assembly 127 for slidably supporting cross beams 127 at their bottom ends. Similarly, base member 109 contains a pair of guides for accepting pinion member 135 at the upper end *k* and a similar pinion member (not shown) connecting with upper end *l* of the members *g* and *h* of assembly 127, for slidably supporting member 127 in beam 109. Thus, the upper end of each of the members of each assembly 127 and 128 and the lower ends thereof are adapted to be slidably moved along guide slots which are spaced apart about the same distance in each of the beams 109, 111, 129 and 131 and are all of the same size and shape. Guides in each of the beams 109 and 111 are substantially vertically disposed above a corresponding guide in beams 129 and 131. Thus, guides 112 and 113 of beam 111 are substantially vertically disposed with reference to guides 139 and 138 of beam 131 and guides in beam 109, opposite guides 112 and 113, are similarly substantially vertically disposed in respect to guides in beam 129, opposite guides 139 and 138.

Horizontal beam 142 connects pinion 136 with the corresponding pinion connecting the bottom end *j* of beam *h* with base 129. A second horizontal beam connects pinion 137 with the pinion member connecting the lower end of member *g* with base 129. Fluid piston cylinder assembly 143 containing piston 144 is connected at its closed end with the last said horizontal beam at about the midpoint thereof and at the end of piston rod 146 with beam 142 also at about a midpoint 147. Cylinder 143 is adapted to receive fluid flow, as described hereinafter, to either extend piston 144 or retract it, as desired. Thus, when fluid under pressure is introduced into cylinder 143 to extend rod 146, the horizontal beams with which the cylinder assembly is connected, including beam 142, are caused to move away from each other to thereby cause the scissors to open and to lower the assembly based on member 106. When fluid under pressure is introduced into cylinder 143 to retract rod 146, the scissors are caused to close to raise the assembly.

Base members 129 and 131 are supported on any suitable transporting means, such as tracks 148, which are operated in any suitable manner for moving the entire assembly from one point to another in the working area.

Any suitable power source can be utilized for delivery and control of flow of fluid to fluid pumps 121, 126 and cylinder assembly 143. Thus, prime mover 150 supported on base 106 is advantageously any suitable electric motor operatively engaged with pump 151 to drive fluid from the storage-pump assembly 149 via line 152 to valve 153 (FIGS. 17, 18) for flow to motors 121, 126 and cylinder 143.

The reservoir is also adapted to receive flow of exhaust fluid from motor 121, 126 and cylinder 143 via line 154 for recirculation to line 152.

In the operation of the above illustrated machine firing head assembly 12, including guide shelf 25, is loaded outside chamber 13 with cartridge 16 and inserted into chamber 13 with lugs 72 in place in a corresponding groove 73 in the chamber side wall. Care is taken that upon insertion of assembly 12 and cartridge 16 into place in chamber 13, the rupturable closure member 16*a* is uniformly urged against its seat at face 53 under some tension from biasing means 22 but short of complete seating. The assembly 12 is then urged forward to apply full biasing action tension to cartridge 16 and to engage lugs 72 into final position and alignment with passageway 74, at which time seating is completed and head 12 is rotated sufficiently to lock each lug 72 under a chamber wall section above passageway 74, as illustrated with reference to FIGS. 6, 7 and 8. Rotation of assembly 12 about 20–25° is generally sufficient depending upon the number and distribution of lugs 72 and grooves 73 and their spacing. When the firing head and cartridge assembly is in the thus loaded and locked position, spring 22 biases cartridge 16 into operating position and shelf 25 serves no function.

The loading procedure completed, housing 10 with associated structure as illustrated with reference to FIG. 1 and supported as illustrated with reference to FIGS. 13–16 is then connected with suitable power source for initiating charge 17 via electrodes 9*a* and 9*b* and is ready for operation.

A presently preferred fluid flow system and its utilization, in the practice of the invention, and the operation of the machine of FIGS. 13–16 in conjunction with that flow system is illustrated with reference to FIGS. 17 and 18 of the drawings. Referring, therefore, to FIGS. 13, 17 and 18, prime mover 150 drives fluid pump 151 to receive fluid from reservoir 149 and to deliver same to the entire system of FIGS. 13–16 via line 152. Pump 151 is connected with a return line for recirculation of fluid to reservoir 149 via line 154 when fluid flow from pump 151 is in excess of that used in the system. Accordingly, pump 151 can be operated continuously, independently of the degree of use made of the fluid delivered therefrom. Assuming the assembly, supported on beams 111 and 112, to be in a less than completely raised position, i.e., the scissors beams are short of their maximum degree of closure, and that it is desired to raise the said assembly to an operation position, fluid is delivered from pump 151 into line 152 with multiple-way valves 171 and 172 closed and multiple-way valve 170 open. Fluid, therefore, is passed through valve throttling means 177 and valve relief means 178 and through line 162 to cylinder 143 in an amount to displace piston 144 so as to retract rod 146 to bring the horizontal beams, with which cylinder 143 and rod 146 are connected, toward each other to thereby cause the scissors beams to move toward a closing position and raise the assembly. During this time fluid in cylinder 143 on the side of piston 144 opposite that receiving fluid from line 162 is discharged via line 163 and valve relief 179 for recirculation to reservoir 149 via line 154. When the desired height has been reached, valve 170 is closed, and valves 171 and 172 are open as shown in FIG. 18 to admit fluid flow from line 152 via valve throttling means 177 and 181, valve relief means 182 and 183 and lines 159 and 157, respectively, to motors 121 and 126. As is well known, continuous flow of fluid through each fluid motor is necessary and, accordingly, fluid is continuously discharged from motors 121 and 126 via lines 161 and 158, respectively, each for discharge and recirculation to reservoir 149 via line 154. With motors 121 and 126 in operation, as illustrated by FIG. 17, gear reducers 123 and 38 are driven so as to, respectively, drive the drill and bit unit and advance its supporting assembly along traverse screw 114 until the bit and stem have advanced the predetermined distance, generally that at which the cone 41 seats in the face of the borehole. At the point of farthest travel of the drill assembly into the borehole, electric firing current is delivered via lines 13*a* and 13*b* and electrodes 9*a* and 9*b* through leg wires 21*a* and 21*b* to initiator 19 to initiate self-sustained decomposition of charge 17 for delivery of resulting high pressure gases into and through the hollow drill stem (via perforation 27) and to and through ports 37 for delivery to the borehole wall to break the surrounding formation. The breaking can be initiated without interruption of the drill stem rotation and, accordingly, can be initiated prior to extension of the drill to the predetermined maximum point of travel, at the said maximum point, or even during retraction of the drill assembly, dependent for the most part upon the formation being worked. Independently of the time at which the blasting is initiated, the drill stem and bit is withdrawn from the point of maximum extension by reversing valve 171, as illustrated with reference to FIG. 18. In this manner the direction of fluid flow through motor 121 is reversed so that fluid enters via line 161 and leaves via line 159 for discharge and recirculation to reservoir 149 via line 154. Rotation of the drive shaft of pump 121 being thereby reversed causes the entire assembly to be moved in reverse along traverse screw 114 so as to effect withdrawal of same. Concurrently valve 172 is reversed, as illustrated with reference to FIG. 18, whereby fluid flows into motor 126 via line 158 and is withdrawn via line 157 for recirculation to reservoir 149 via line 154. Reversal of direction of rotation of the stem and drill assembly facilitates withdrawal of the assembly from the broken formation.

During the time subsequent to initiation of decomposition of charge 17, i.e., the shooting, the broken formation is removed from the face by any suitable means and the machine is moved forward on its tracks to the remaining solid face for the next cycle of drilling and "shooting." Thus, when the machine is moved to the new face, valves 171 and 172 having been moved to a closing position upon completing the retraction of the drill assembly, are moved to the position of FIG. 17 so as to thereby cause resumption of the concurrent drilling and forwardly moving operation of the drill assembly.

If between shootings it is desired to raise or lower the drill assembly prior to advancing the drill in the next cycle, this can be done by moving valve 170 to either the position shown in FIG. 17 for raising the assembly or to that shown in FIG. 18 for lowering the same, valve 170 being moved to a closed position when the desired height has been reached.

As illustrated elsewhere in the specification, see also FIG. 15, cylinder 164 with piston rod 169 can be advantageously utilized in lieu of the traverse screw structure of FIGS. 13 and 14 in effecting the forward and reverse movement of the assembly. In that event fluid from line 159 of FIG. 17 passes into cylinder 164 so as to displace piston 168 in the direction which causes extension of piston rod 169 to move the assembly forward. During this time fluid in cylinder 164 intermediate piston 168 and the end thereof containing piston rod 169 is displaced by piston 168 and discharged through line 161 for recirculation to the reservoir 149 via line 154. The assembly is, therefore, moved forward in exactly the same manner, i.e., slidably, as when the traverse screw assembly is utilized. Similarly, upon reaching the maximum point of travel of the assembly, valve 171, upon being reversed, see FIG. 18, to reverse direction of travel of piston 168 and thus to retract the drill assemby from the borehole, directs fluid into the cylinder 164 via line 161 for movement of piston 168 in a retracting direction so that fluid is discharged from cylinder 164 via line 159 for recirculation to reservoir 149 via line 154.

As is apparent from the foregoing, cylinder 143 can be operated concurrently with operation of motors 121 and 126 only if the drill bit assembly is free from the interior of the borehole. However, motor 121, or cylinder 164 in lieu thereof, and motor 126 are always operated concurrently unless for any reason it is desired to terminate operation of motor 126 during retraction of the bit and drill.

Also as is apparent, shooting can take place independently of (1) whether the bit and drill unit is rotating, (2) the direction of travel of the bit, and (3) position of the stem and bit in respect of the point of maximum extension.

As is well known in the art, a thermally decomposable gas-producing charge capable of sustaining its decomposition, to be utilized as a source of high pressure gas as energy for blasting purposes, is initiated by heat developed by combustion of a "primer" composition which is, in turn, initiated by a suitable igniter means such as a resistance wire, a hot spark, a suitable squib assembly, or the like. In most instances an electrically heated resistance wire in contact with a primer composition ignites the primer within a period in the order of about 3–5 seconds. After from 0.2–1 second burning of the primer, a pressure is built up in the order of say 1200 p.s.i.g. in the closed chamber, which facilitates initiation of decomposition of the gas-producing charge. The gas-producing charge requires generally one second or less for complete decomposition of same, during which time pressure is built up to a value in the order of from about 10–20,000 p.s.i. At a predetermined pressure value in that range the rupture disk or other means employed for confining the high gas pressure in the chamber is actuated to permit release of high pressure gas from the chamber. Thus, the total time from initiation of the primer to release of high pressure gas is in the order of less than 10 seconds.

Although any suitable igniter means can be employed, a squib-type cap, i.e., an electrical activator 19, is now preferred in view of the ease and simplicity of procedure by which it can be incorporated within the cartridge in operative relationship with the primer to initiate same, and particularly in view of the simplified electrical firing system that can be employed for its actuation. This (activator 19, FIG. 2) contains a gasless heat generating charge in a bronze shell, the shell being heated to a dull red without bursting. It does not become sufficiently hot to ignite methane-air mixtures when fired directly in such mixtures. An exemplary squib is one which contains a 0.5 g. mixture of $Pb_3O_4/MnB_2$, 60/40, as an ignition composition loaded into a copper shell. It is ignited by electrically generated heat of a fine resistance or "bridge" wire within the mixture. Another squib assembly advantageously employed contains 0.5 g. antimony/potassium permanganate, 45/55, as an ignition composition, which is initiated by a matchhead, the entire squib assembly being in a copper shell. A now preferred resistance element, employed in lieu of a squib, comprises such an element that forms a knife edge facing the cartridge and attached to the chamber closure member, e.g., across the electrodes 9a and 9b of FIGS. 1 and 2 and spaced sufficiently from the closure block so as to cut into the cartridge in direct contact with the primer when the block is in closing position in the chamber. This embodiment affords a quick assembly of the charge within the chamber and eliminates the need for any wires in the chamber and eliminates the need for time otherwise required for engaging lead wires from the electric power source with an ignition system in the chamber. A hot spark-type igniter can be advantageously employed particularly in conjunction with a supplementary ignition composition.

It is also within the scope of the invention to employ a separate ignition composition in the cartridge in operative relationship with a separate primer composition and the main gas-producing charge. In that event a resistance wire-type igniter is advantageously disposed in operative relation with the said ignition mixture to initiate it. Exemplary ignition compositions (weight basis) employed in such an embodiment are:

A

Antimony _____ 45.0
Potassium permanganate _____ 55.0

B $Pb_3O_4$ _____ 60.0
$MnB_2$ _____ 40.0

Exemplary gas-producing charges employed in the practice of the invention are:

A

Ammonium nitrate _____ 49.0
Magnesium nitrate hexahydrate _____ 34.0
Carbonaceous (nut meal, pulp, starch) ____ 17.0

_____
100.0

B

| | |
|---|---|
| Ammonium nitrate | 75.0 |
| Calcium carbonate | 25.0 |
| | 100.0 |

C

| | |
|---|---|
| Ammonium nitrate | 90.0 |
| Starch | 10.0 |
| | 100.0 |

D

| | |
|---|---|
| Ammonium nitrate | 65.0 |
| Calcium formate | 34.9 |
| Calcium stearate | 0.1 |
| | 100.0 |

E

| | |
|---|---|
| Guanidine nitrate | 30.0 |
| Magnesium nitrate hexahydrate | 60.0 |
| Carbonaceous | 10.0 |
| | 100.0 |

Any suitable primer composition can be employed. Exemplary primers are as follows:

A

| | |
|---|---|
| Guanidine nitrate | 59.5 |
| Ammonium persulfate | 33.0 |
| Cuprous chloride | 6.5 |
| Bentonite | 0.5 |
| Castor oil | 0.5 |
| | 100.0 |

B

| | |
|---|---|
| Nitrocellulose | 79.5 |
| Dibutyl phthalate | 18.5 |
| $K_2SO_4$ | 1.0 |
| Diphenylamine | 1.0 |
| | 100.0 |

C

| | |
|---|---|
| Urea | 45.0 |
| Sodium nitrite | 45.0 |
| Cuprous chloride | 10.0 |
| | 100.0 |

D

| | |
|---|---|
| Nitrocellulose | 20.0 |
| Nitroglycerin | 19.0 |
| Nitroguanidine | 54.7 |
| Ethyl centralite | 6.0 |
| Cryolite | 0.3 |
| | 100.0 |

E

| | |
|---|---|
| Guanidine nitrate | 61.5 |
| Ammonium persulfate | 35.0 |
| Cuprous chloride | 2.5 |
| China clay | 0.5 |
| Castor oil | 0.5 |
| | 100.0 |

The above composition (D) is particularly preferred.

The material from which the cartridge shell is fabricated is one which is substantially completely destroyed by heat developed during decomposition of the main charge, paper being now preferred. Other shell materials include suitable plastic or fibrous materials. The destruction is essentially a combustion supported by combined oxygen in the main charge.

It is generally preferred in the winning of coal that suitable undercutting with or without side and/or top cutting be utilized in use of a chamber assembly of the invention.

Although it is most convenient in the practice of the invention to utilize a cartridge containing a rupture member as a closure as described herein, any suitable rupturable member can be disposed across any portion of the chamber vessel to close the said chamber, it being important in any event that the rupturable element be between the charge and the hollow portion of the associated drill stem. Although a rupturable element as above described is preferred as means for confining the high pressure gases developed within the chamber, any suitable means can be employed such as valve means for retaining high pressure air and other gases in a chamber for release in a blasting step, known in the prior art.

Exemplary, and now preferred, chamber and drill stem dimensions and charge weights are as follows:

Chamber:
  Length _____inches__ 12–108
  I.D. _____inches__ 4–1⅜

Charge Weights:
  Gas-producing charge _____g__ 100–700
  Primer _____g__ 20–250
  Ignition mixture [1] _____g__ 0.2–2.5

Drill Stem:
  Length _____inches__ 24–84
  I.D. _____inch__ ½–1¼

[1] When utilized. Can also be interchangeable with prime mixture.

In each of a series of tests decomposition of a gas-producing charge was initiated in a closed chamber connected in gas-tight relation with a simulated hollow drill stem, a rupturable disk being disposed across the chamber to close same intermediate the charge and the chamber section openly connecting with the stem. The stem was disposed in a borehole in a coal face. The formation around the borehole was undercut. The charge was initiated by heating a resistance element in direct contact with a primer composition disposed adjacent the main, or gas-producing, charge. The following tabulation is a summary of these tests:

| Run No. | Approx. Gas Pressure at Outlet of Stem (p.s.i.) | Stem, inches | | Borehole, inches | | Firing Time, seconds | Tons Coal per Lb. of Main Charge | Charge Wt., g. |
|---|---|---|---|---|---|---|---|---|
| | | Length | I.D. | Length | I.D. | | | |
| A | 8,700 | 24 | 1³⁄₁₆ | 24 | 2 | 5 | 1.7 | 254 |
| B | 8,700 | 24 | 1³⁄₁₆ | 24 | 2 | 7 | 1.9 | 254 |

Main Charge Composition, Wt. (160 g.):

| | |
|---|---|
| Ammonium nitrate | 49 |
| Magnesium nitrate 6$H_2O$ | 34 |
| Wood pulp | 17 |
| | 100 |

Primer Composition, Wt. (29 g.):

| | |
|---|---|
| Guanidine nitrate | 61.5 |
| Ammonium persulfate | 35.0 |
| Cuprous chloride | 2.5 |
| China clay | 0.5 |
| Castor oil | 0.5 |
| | 100.0 |

The fines content of the broken formation was low.

The foregoing data demonstrate that a high pressure gas product from decomposition of a gas-producing charge in accordance with this invention can be delivered into and through a hollow drill stem to the wall of the borehole to effect desired breaking of the formation.

Example

By way of further example, a chamber-drill assembly of FIG. 1, mounted on a scissors-type elevator as illustrated with reference to FIG. 13 for raising and lowering same, in combination with a cylinder-piston assembly of FIG. 15 for moving the chamber-drill forwardly and in reverse, was utilized in the mining of coal. The assembly was moved into position for blasting a coal seam 8 feet high. The gas-producing charge 16 was that described in column 14, lines 70–75 herein as charge "A," having a weight of one pound. The primer 17 was that described in column 15, lines 50–57 herein as "D." The activator 19 contained an ignition composition "B" described herein in column 14, lines 63–66.

The combined assembly was raised to a height of 4 feet from the bottom of the seam by operation of the scissors elevator mechanism. Rotation of the drill was initiated concurrently with operation of the piston-cylinder assembly for moving the same forward into the seam. When the drill had penetrated the seam a depth of 28 inches, and while drilling was still in progress, the charge was fired by introduction of firing current across the electrodes via the squib initiator.

The charge decomposition, as result of the firing, developed a pressure of 10,000 p.s.i. in the chamber, i.e., chamber 13, which caused rupture of the rupturable element 16a, a phenolic resinous material. The blast resulting from pressure of gases released from the chamber through the drill stem and ports resulted in breakage extending along the full height of the seam and full depth of the bore and extending about 5 feet on each side of the drill. The breakage was coarse lumps of uniform size for easy handling by a loading machine. The total coal breakage was 7–8 tons. Substantially no smoke was formed during the entire operation.

As will be evident to those skilled in the art, various modifications can be made or followed, in the light of the foregoing disclosure and discussion, without departing from the spirit or scope of the disclosure or from the scope of the claims.

What we claim and desire to protect by Letters Patent is:

1. Apparatus for mining, comprising a chamber; a closed tube in said chamber formed from a combustible material and containing a thermally decomposable gas-producing charge capable of self-sustained decomposition, and a rupturable end closure member for said tube adapted to be seated, as described hereinafter, and to then rupture in response to development of gas pressure from decomposition of said charge; means within said chamber for initiating said decomposition; a hollow stemmed drill-bit assembly with ports in the stem wall, and said stem being rotatably supported in connection with said chamber in direct gas-tight communication of its interior with the interior of said chamber; seating means in said chamber encompassing the face of said stem connecting with said chamber, and said rupturable member being adapted to seat against said seating means; and said closed tube being supported in said chamber so as to seat said rupturable member against said seating means.

2. In apparatus of claim 1, means for supportably moving said chamber and drill apparatus vertically and horizontally.

3. Apparatus for mining, comprising an elongated chamber; a closed elongated cartridge, in said chamber, formed from a combustible material, and a rupturable end closure of said cartridge adapted to rupture at a predetermined gas pressure developed by thermal decomposition of a gas-producing charge described hereinafter; a thermally decomposable gas-producing charge, capable of sustaining its decomposition, disposed within said cartridge; a primer composition in said cartridge intermediate said gas-producing charge and the cartridge end opposite said rupturable member, and adapted to burn to initiate decomposition of said charge; means within said chamber for initiating burning of said primer; a drill assembly comprising a stem containing a perforation along its axis and a drill bit rigidly connected with one end thereof, and said stem containing at least one port in a wall thereof leading from the said perforation in a direction away from said bit; said stem at its other end being rotatably supported, and terminating, in an end wall portion of said chamber in open gas-tight communication with said perforation and the interior of said chamber; a seat in the said end wall portion of said chamber adapted to accept said rupturable member in seating relation thereto, and spaced from the end of said stem therein in open gas-tight communication with both the interior of said chamber and the perforation of said stem; and means within said chamber for supporting said elongated cartridge in position for seating said rupturable member against said seat.

4. A chamber-drill assembly comprising an elongated housing closed at one end; a wall member transversely disposed in said housing intermediate the ends thereof to divide said housing into a closed end section and an open end section, and containing a passageway extending therethrough to directly communicate said sections; a drill assembly comprising a hollow stem and a drill rigidly connected to one end thereof, and a plurality of ports in the wall of said stem extending a direction away from said drill; said stem, at the other end thereof, being axially connected with said housing in its said open end section in open gas-tight communication with said passageway; bearing means within said open end section intermediate and in contact with said stem portion therein and the inner wall of said open end housing section to rotatably support said stem in said open end section; means for rotating said drill assembly while rotatably supported as described; a closed elongated paper cartridge in the closed housing section having a rupturable closure member at one end, adapted to rupture at a predetermined high gas pressure developed by decomposition of a gas-producing charge described hereinafter; a gas-producing charge, thermally decomposable and capable of sustaining its decomposition, within said cartridge, and disposed adjacent said rupturable end member; a primer composition, in said cartridge, adjacent said charge and adapted to burn to initiate decomposition of said charge; electrically operated initiating means, within said closed housing section adapted to impart heat to said primer to initiate said burning of same; said transversely disposed wall being shaped on its side adjacent said closed housing section, in an area encompassing said passageway, to seat said rupturable closure member of said cartridge; and means within said closed housing section for biasing said cartridge in position to seat said rupturable member against the above described shaped wall portion.

5. Apparatus of claim 4 wherein said paper cartridge is biased into said position for seating said rupturable member, by a spring element longitudinally disposed in said housing intermediate said cartridge and the end of said chamber opposite said stem and supported against said opposite end.

6. Apparatus of claim 4 wherein said drill assembly comprises an additional stem section intermediate the aforesaid stem section and said drill bit, said second stem section containing flight vanes on its outside wall disposed in a direction away from said drill bit.

7. In apparatus of claim 4, said closed housing section containing a valved conduit adapted to be opened as a vent for high pressure gas from the said closed section.

8. Apparatus of claim 4 wherein said electrically operated initiating means is a squib-type cap assembly, within said primer.

9. Apparatus for mining, comprising a chamber; a closed tube in said chamber formed from a combustible material and containing a thermally decomposable gas-producing charge capable of self-sustained decomposition, and a rupturable end closure member for said tube adapted to be seated, as described hereinafter, and to then rupture in response to development of gas pressure from decomposition of said charge; means within said chamber for initiating said decomposition; a hollow stemmed drill-bit assembly, with at least one port in the stem wall leading from the hollow stem interior; said stem, at its end opposite said bit, being rotatably supported, and terminated, in a wall portion of said chamber in open gas-tight communication of its hollow interior with the interior of said chamber; seating means in the said wall portion of said chamber, spaced from the face of the said stem portion in said wall, and in open gas-tight communication with both said chamber and the hollow interior of said stem, and said rupturable member being adapted to seat against said seating means; and said closed tube being supported in said chamber so as to seat said rupturable member against said seating means.

References Cited in the file of this patent

UNITED STATES PATENTS

| | | |
|---|---|---|
| 722,166 | Taft | Mar. 3, 1903 |
| 1,740,683 | Gartin | Dec. 24, 1929 |
| 2,151,328 | Noble | Mar. 21, 1939 |
| 2,314,366 | Paget | Mar. 23, 1943 |
| 2,799,488 | Mandt | July 16, 1957 |
| 2,869,462 | Davidson et al. | Jan. 20, 1959 |
| 2,883,079 | Binns | Apr. 21, 1959 |